United States Patent [19]
Hupperts et al.

[11] Patent Number: 5,152,545
[45] Date of Patent: Oct. 6, 1992

[54] TRAILER TOW BAR LIFT MECHANISM

[75] Inventors: Stephen B. Hupperts, St. Charles; Tim R. Thorman, St. Louis; T. Paul Gleeson, Ballwin, all of Mo.

[73] Assignee: Southwest Mobile Systems Corporation, St. Louis, Mo.

[21] Appl. No.: 601,203

[22] Filed: Oct. 19, 1990

[51] Int. Cl.$^5$ .................... B60D 1/26; B60D 1/36; B60D 1/44
[52] U.S. Cl. .................... 280/463; 280/474; 280/477; 280/478.1; 280/479.1
[58] Field of Search .............. 280/400, 462, 463, 474, 280/477, 478.1, 479.1, 405, 407, 405.1, 418

[56] References Cited

U.S. PATENT DOCUMENTS

| | | |
|---|---|---|
| 2,452,710 | 11/1948 | Allen .................... 280/418 |
| 3,269,750 | 8/1966 | Tantlinger .................... 280/474 |
| 3,479,055 | 11/1969 | Cunha et al. .................... 280/418 |

FOREIGN PATENT DOCUMENTS 2812750  10/1979  Fed. Rep. of Germany ...... 280/463

Primary Examiner—Mitchell J. Hill
Attorney, Agent, or Firm—Polster, Lieder, Woodruff and Lucchesi

[57] ABSTRACT

A lift mechanism is provided for lifting the tow bar of a trailer to facilitate connection of the trailer tow bar to a truck's pintle. In the preferred embodiment the lift mechanism includes a bladder which may be connected to a pneumatic system on the trailer. The air bladder is inflated to raise the tow bar above the level of the pintle, facilitating connection of the tow bar to the pintle. Because the tow bar is independent of the lift mechanism, the tow bar has a free travel range greater than the powered travel range.

17 Claims, 3 Drawing Sheets

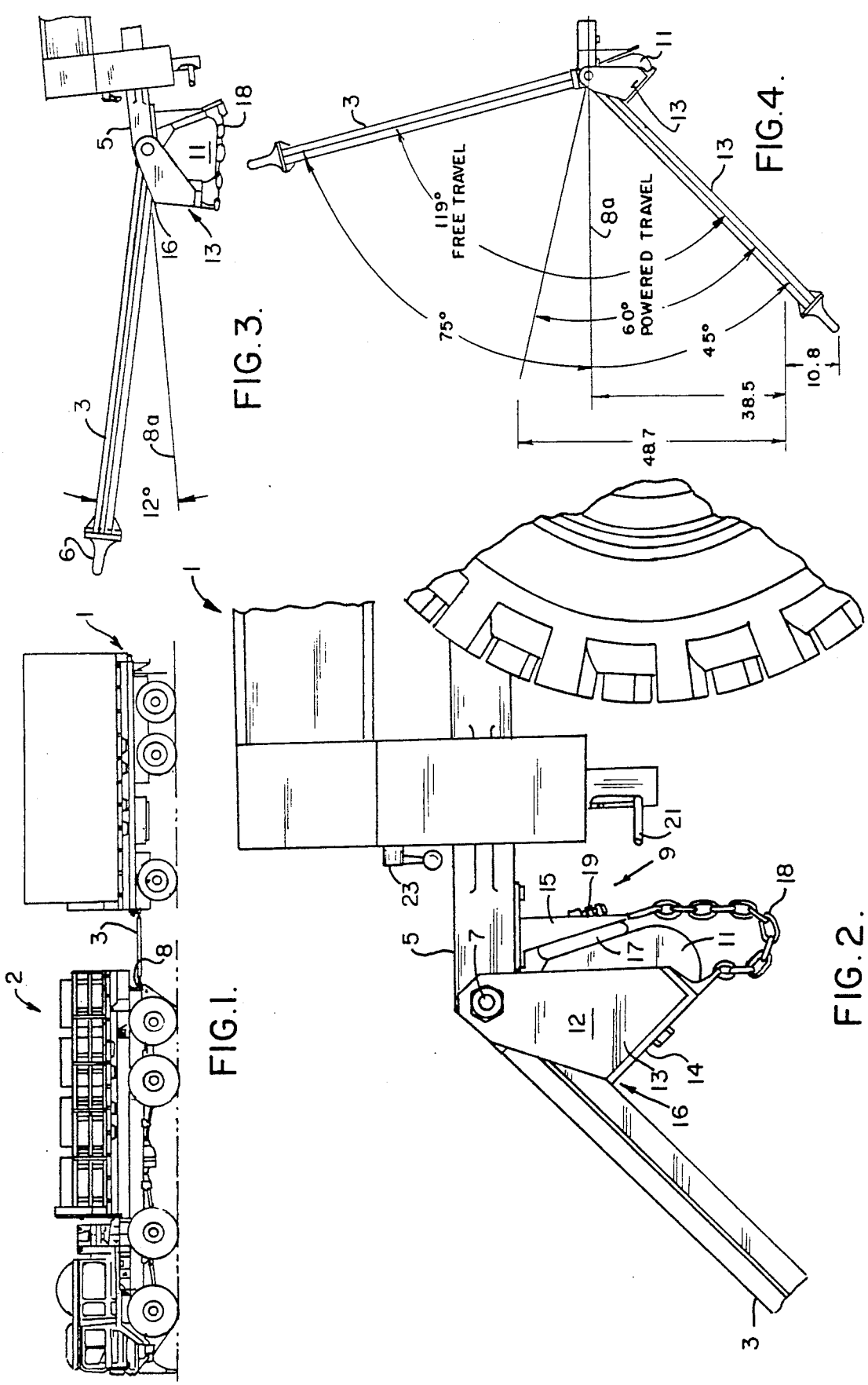

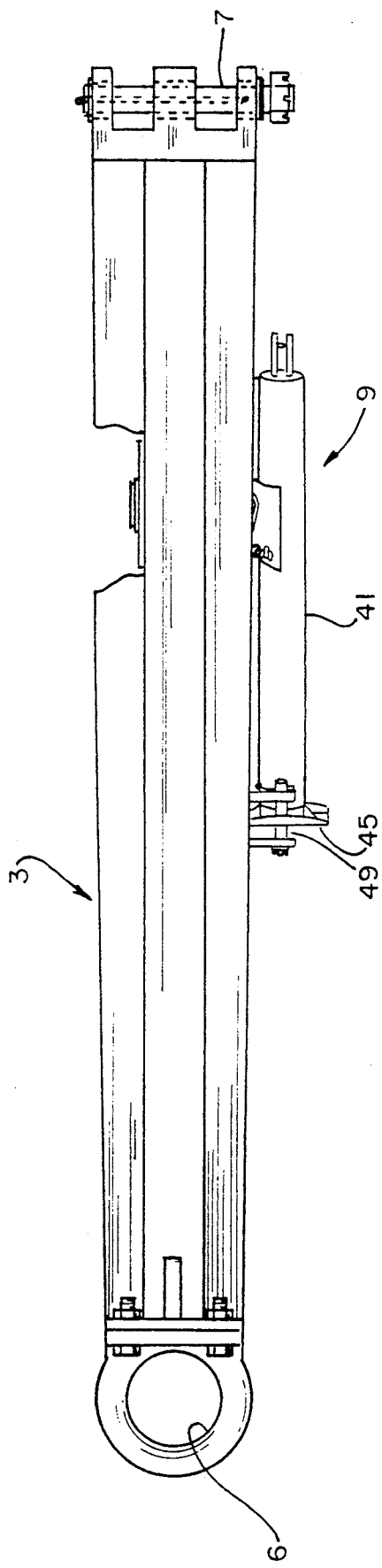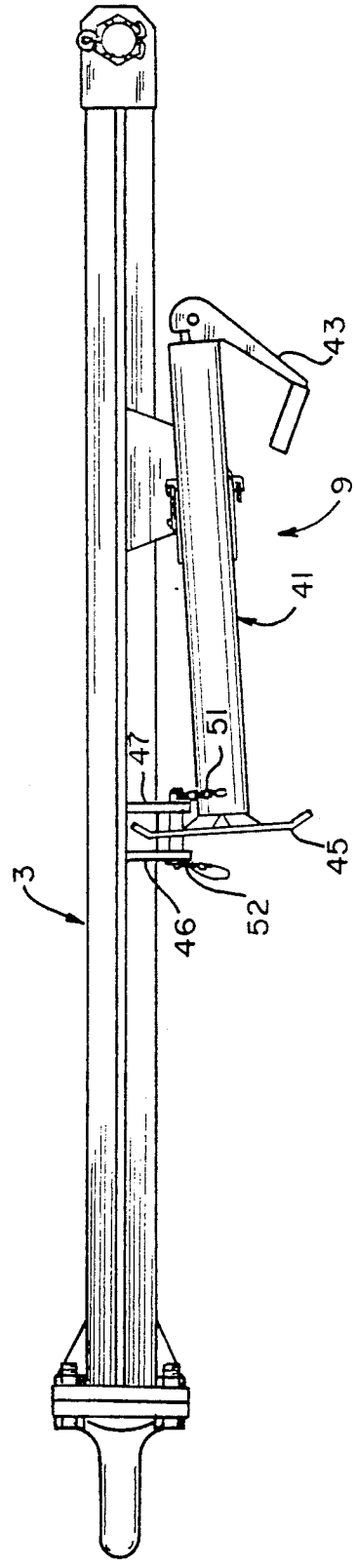

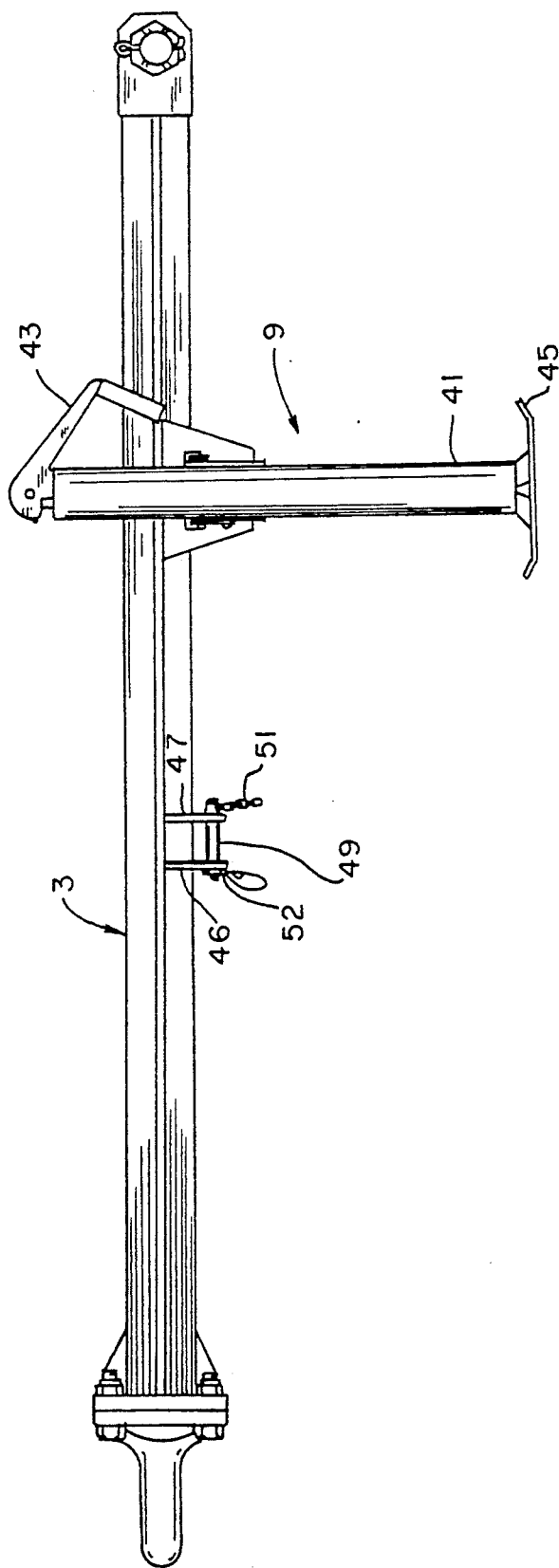
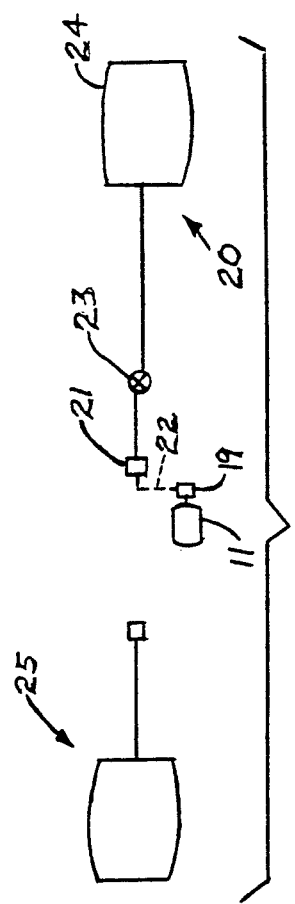
FIG.7.
FIG.8.

TRAILER TOW BAR LIFT MECHANISM

BACKGROUND OF THE INVENTION

This invention relates to trailer and truck combinations, and in particular, to a tow bar lift mechanism for a trailer employed in a palletized load system. While the invention is described with particularity in connection with a military palletized load system trailer, those skilled in the art will recognize the wider applicability of the inventive principles disclosed hereinafter.

Palletized load systems (PLS) have become accepted transportation systems in a wide variety of applications. In general, PLS systems include a truck, a trailer, and flat racks designed to be on-loaded and off-loaded on both the truck and the trailer. The trailer in the combination, is carried behind the truck in a tandem operation through a tow bar. PLS systems provide efficient methods to distribute supplies and equipment which are carried on or by a flat rack.

In operational use, the trailer often is disconnected from the truck while the equipment carried by the trailer is off-loaded. Thereafter, the trailer must be reconnected to the truck in order to move it to the next location. In military applications of palletized load systems, both the truck and trailer are designed to carry heavy loads over rough terrain. Consequently, the components, including the trailer tow bar are sturdy and heavy. It is often difficult in the field to reattach the tow bar to the truck when movement of the trailer is desired. While there have been a number of power assisted mechanisms available in the past, they all suffer from certain deficiencies. Because of the rough terrain over which the truck must pass, the tow bar must be able to operate over a wide range, in both the vertical and horizontal plane. Power assist mechanisms in the past, which have been interconnected to the tow bar, have restricted this operational movement. Even when the power assist is capable of disconnection from the tow bar, the mechanisms have been complicated and expensive.

One of the objects of this invention is to provide a simplified and economical power assist device for attaching a tow bar to a truck.

Another object of this invention is to provide a tow bar lift mechanism which will enable operators of widely varying strength to raise the tow bar a sufficient height to attach the tow bar to a truck.

Another object of this invention is to provide a tow bar lift mechanism that is independent of the tow bar permitting the tow bar movement over its normal operating range.

Another object of this invention is to provide a tow bar lift mechanism which is powered from a power source available on the truck or trailer or both.

Other objects will be apparent to those skilled in the art in view of the following disclosure and accompanying drawings

SUMMARY OF THE INVENTION

In accordance with this invention, generally stated, a lift mechanism for raising a tow bar is provided which includes a mechanism for raising the tow bar above the pintle of a truck to permit interconnection of the tow bar to the truck. In the preferred embodiment, the mechanism includes an inflatable bladder, which when inflated exerts an upward force on the tow bar. The bladder is mounted in a lift bracket. The lift bracket is pivotally mounted to the trailer intermediate the bladder and the pivot bar. Neither the bladder nor the lift bracket are attached to the tow bar. Thus, the tow bar may move independently of the mechanism used to raise it.

In another embodiment, the lift mechanism is an extendable retractable leg pivotally mounted to the tow bar.

BRIEF DESCRIPTION OF THE DRAWINGS

In the drawings, FIG. 1 is a view in side elevation of a palletized load system trailer and a truck in which the present application finds application;

FIG. 2 is a view in side elevation of one illustrative embodiment of the present invention showing the tow bar in a lowered position;

FIG. 3 is a view in side elevation showing the tow bar in raised position;

FIG. 4. is a view in side elevation of the lift mechanism of FIG. 2 demonstrating the free and powered travel of the tow bar of the present invention;

FIG. 5 is a top plan view of a trailer tow bar employing a second embodiment of the present invention;

FIG. 6 is a side elevational view of the tow bar of FIG. 5;

FIG. 7 is a view in side elevation of the tow bar of FIG. 6; and

FIG. 8 is a pneumatic diagram of the invention of FIG. 2.

DESCRIPTION OF THE PREFERRED EMBODIMENT

Referring now to FIGS. 1-4, reference numeral 1 generally indicates a palletized load system trailer connected to a truck 2 by a tow bar 3. Tow bar 3 is pivotally connected to a pivot bar 5 of trailer 1 by means of an axle 7 which is journaled through tow bar 3 and pivot bar 5 to permit rotation of tow bar 3. An eyelet 6 at one end of tow bar 3 allows the connection of the trailer to a pintle 8 at the back of truck 2.

A lift mechanism 9 is employed to permit relative movement of tow bar 3. In the preferred embodiment, lift mechanism 9, includes an inflatable bladder 11 and a tow bar lift bracket 13. Tow bar lift bracket 13 is pivotally connected to trailer 1 at the junction of tow bar 3 and pivot bar 5 by axle 7, the same axle which mounts tow bar 3 to pivot bar 5. Bracket 13 and tow bar 3 thus have the same axis of rotation.

Lift bracket 13 includes spaced apart side plates 12 and a front plate 14 which extends between side plates 12. Side plates 12 are spaced apart a sufficient distance such that lift bracket 13 is wider than pivot bar 5. Bladder 11 fits between side plates 12 and against front plate 14. Side plates 12 thus serve to control the direction of inflation of bladder 11. They prevent sideways inflation so that the bladder will inflate to raise tow bar 3.

Bracket 13 is positioned between bladder 11 and tow bar 3 such that when bladder 11 is inflated, it bears against a front face of lift bracket 14. The top of front plate 14 is beneath tow bar 3, as at 16. When bladder 11 is inflated, the bladder bears against bracket 13, causing bracket 13 to bear against tow bar 3 at 16, thereby raising tow bar 3. When bladder 11 is fully inflated, tow bar 3 is raised approximately 12°-15. above the level of truck pintle 8, shown as line 8a in FIGS. 3 and 4.

Tow bar 3 is not connected either to bracket 13 or bladder 11 and thus has freedom of movement beyond the range of powered travel, i.e., the point to which bladder 11 can raise tow bar 3 (FIG. 4). Tow bar 3 preferably has a range of powered travel of about 60° and a range of free travel of about 120°. Tow bar 3 can thus pivot approximately 60° beyond the range of powered travel. The separation of tow bar 3 and lift mechanism 9 leads to a longer useful life of lift mechanism 9. If the two were connected, tow bar 3 could stretch bladder 11 beyond its limit, possibly tearing it and rendering it inoperable. The separation of lift mechanism 9 and tow bar 3 prevents this malfunction.

Bladder 11 is fixed to a bladder bracket 15 which is bolted or otherwise secured to the underside of pivot bar 5. A cushion 17 is fixed to bladder bracket 15 intermediate the bracket 15 and bladder 11. A stop chain 18 is connected between brackets 13 and 15 to limit the pivotal movement of lift mechanism 9 to prevent undue stretching of, and possible damage to, bladder 11. Stop chain 18 limits the range of power travel. Thus if stop chain 18 were lengthened or shortened, the range of power travel would be increased or decreased.

A quick disconnect air fitting 19 attached to bracket 15 communicates with bladder 11 through cushion 17 and allows for inflation of the bladder when connected to the trailer's pneumatic system 20. Air fitting 19 is preferably connected to a nipple 21 by a flexible tube 22. Nipple 21 communicates with the trailer's pneumatic system. Specifically, bladder 11 is inflated by pressurized air tanks 24 on trailer 1. Air tanks 24 are pressurized by the truck's pneumatic system 25 prior to connection of the bladder 11 to the trailer's pneumatic system 20. A control valve 23 inserted in the trailer's pneumatic system regulates the airflow to and from nipple 21 to control the rate of inflation and deflation of bladder 11.

Valve 23 may also be used to partially inflate or deflate bladder 11, for example when the truck and trailer are positioned such that tow bar 3 need not be lifted through the full range of power motion In this manner, lift mechanism 9 also acts as a counter-balance to tow bar 3.

The air flow of the trailer 1 to lift mechanism 9 is such that bladder 11 can be operated only when the trailer's pneumatic system 20 is uncoupled from the truck's pneumatic system 25. Nipple 21 provides for connection of the trailer's pneumatic system to the truck's air supply. Thus to connect the trailer air system to truck 2 for transportation, quick disconnect fitting 19 must be disconnected from nipple 21. As there is no check valve on quick disconnect fitting 19, bladder 11 is deflated during transportation thus extending bladder 11 useful life.

The pneumatic system 20 of the trailer may also be configured such that the bladder does not have to be physically disconnected from the trailer's pneumatic system to connect the trailer's pneumatic system to the truck's Rather, a pilot valve can be used which can selectively place the air bladder 11 in communication with air tanks 24. Specifically, when the trailer pneumatic system is connected to the truck's pneumatic system, the pilot valve releases the air in bladder 11.

FIGS. 6 and 7 show a second embodiment of lift mechanism 9. This second embodiment includes an extendable, retractable arm 41 pivotally mounted to the side of tow bar 3 intermediate axle 7 and eyelet 6. Arm 41 includes a crank handle 43 and a foot or base 45. Rotation of handle 43 will extend or retract arm 41 to raise or lower tow bar 3.

When in travel, arm 41 is locked against tow bar 3. More specifically, tow bar 3 includes a pair of apertured spaced apart plates 46 and 47 between which foot 45 fits. A pin 49 extends through the apertures in plates 46 and 47 and through a similar aperture in foot 45. A pair of pin and chain assemblies 51 and 52 on either end of pin 49 holds pin 49 in place to retain arm 41 in its raised locked position. Because it is attached to tow bar 3, arm 41 moves with the tow bar 3. Thus, it does not interfere with the operation of the tow bar. Nor does movement of the tow bar 3 affect the lift mechanism during transportation.

To raise tow bar 3, pin 49 is removed from foot 45 and plates 46, 47. Arm 41 is pivoted so that foot 45 hangs vertically from tow bar 3. Crank handle 43 is then rotated to extend arm 41 to raise tow bar 3 above the level of the truck's pintle 8.

Numerous variations, within the scope of the appended claim, will be apparent to those skilled in the art in light of the foregoing description and accompanying drawings.

Having thus described the invention, what is claimed and desired to be secured by Letters Patent is:

1. A lift mechanism for raising a tow bar of a trailer above the level of a pintle of a truck for connecting said tow bar to said truck, said tow bar being pivotally connected to said trailer; said lift mechanism including means for preventing said lift mechanism from interfering with the operation of said tow bar; means for preventing movement of said tow bar by which said trailer is being pulled from affecting said lift mechanism; and an inflatable bladder secured to said trailer which, when inflated, urges against said tow bar causing said tow bar to pivot upwardly.

2. The lift mechanism of claim 1, further including a tow bar lift bracket pivotally mounted to said trailer, said bracket being positioned intermediate said bladder and said tow bar such that said bladder urges against said bracket when inflated, said bracket including an edge which bears against said tow bar to raise said tow bar.

3. The lift mechanism of claim 2, in which said tow bar is operatively engaged with, but not connected to, said lift bracket.

4. The lift mechanism of claim 3, further including means for pivoting said tow bar above the level to which said lift mechanism raises it.

5. The lift mechanism of claim 2, wherein said tow bar and said lift bracket pivot about the same axis of rotation.

6. The lift mechanism of claim 1, wherein said trailer has a pneumatic system, said lift mechanism further including means for raising said tow bar to any desired level and maintaining it there, said raising and maintaining means comprising control means in said pneumatic system of said trailer for controlling the rate of inflation and deflation of said bladder and for allowing for partial inflation of said bladder.

7. The lift mechanism of claim 6, further including means for allowing said lift mechanism to operate only when said trailer's pneumatic system is operatively disconnected from said truck's pneumatic system.

8. The lift mechanism of claim 6, further including means for deflating said bladder during transportation of said trailer.

9. The lift mechanism of claim 6, wherein said control means comprises a control valve in said pneumatic system of said trailer.

10. A tow bar counterbalance for raising or lowering a tow bar, pivotally connected to a trailer, to a desired level and for maintaining said tow bar at that level, said tow bar counterbalance comprising an inflatable bladder fixed to said trailer, said bladder bearing against said tow bar to raise said tow bar when said bladder is inflated, said bladder communicating with a source of air over an air line, and air flow control means in said air line.

11. The tow bar counterbalance of claim 10, wherein said air flow control means comprises a control valve.

12. The two bar counterbalance of claim 10, further including a lift bracket interposed between said bladder and said tow bar, said bladder bearing against said bracket when inflated to urge said bracket against said tow bar.

13. A lift mechanism for raising a tow bar, which is pivotally connected to a trailer, above the level of a pintle of a truck to a facilitate connection of said tow bar to said truck; said lift mechanism comprising means for preventing said lift mechanism from interfering with the operation of said tow bar and for preventing movement of said tow bar from affecting said lift mechanism, said means comprising an inflatable bladder secured to said trailer and which, when inflated, bears against said tow bar causing it to pivot upwardly, and a tow bar lift bracket pivotally mounted to said trailer, said bracket being positioned intermediate said bladder and said tow bar such that said bladder urges against said bracket when inflated, said bracket including an edge which urges against said tow bar to raise said tow bar.

14. The lift mechanism of claim 13, wherein said trailer has a pneumatic system, said lift mechanism further including means for raising said tow bar to any desired level and maintaining it there, said raising and maintaining means comprising control means in said pneumatic system of said trailer for controlling the rate of inflation and deflation of said bladder and for allowing for partial inflation of said bladder.

15. The lift mechanism of claim 14, further including means for allowing said lift mechanism to operate only when said trailer's pneumatic system is operatively disconnected from said truck's pneumatic system.

16. A lift mechanism for raising a tow bar of a trailer above the level of its connection with a towing vehicle, comprising:
  means for adjustably raising said tow bar through a degree of movement, said means operatively engaging said tow bar during the raising thereof;
  said adjustably raising means including means for providing a greater degree of movement of said tow bar with respect to said tow bar's engagement with the towing vehicle than the degree of movement provided by said means for adjustably raising said tow bar; a bracket rotatably mounted with respect to said trailer and engageable with said tow bar; and, an inflatable bladder engagable with said bracket so that the inflation of said bladder forces said bracket against said tow bar, causing said tow bar to rise upwardly.

17. A lift mechanism for raising a tow bar of a trailer above the level of a pintle of a truck for connecting said tow bar to said truck, said tow bar being pivotally connected to said trailer; said lift mechanism including:
  means for preventing the lift mechanism form interfering with the operation of said tow bar and means for preventing movement of said tow bar, which said trailer is being pulled by, from affecting said lift mechanism;
  an inflatable bladder secured to said trailer which, when inflated, bears against said tow bar causing said tow bar to pivot upwardly; and
  a tow bar lift bracket pivotally mounted to said trailer, said bracket being positioned intermediate said bladder and said tow bar, such that said bladder urges against said bracket when inflated, said bracket having an edge which bears against said tow bar to raise said tow bar;
  said tow bar and said lift bracket being pivotable about the same axis of rotation.

* * * * *